Sept. 13, 1938.  J. H. KING ET AL  2,129,941
BUMPER MAT
Filed Dec. 9, 1935

INVENTORS.
John H. King and
Royal R. Wotring,
BY
Hood + Hahn.
ATTORNEYS.

Patented Sept. 13, 1938

2,129,941

UNITED STATES PATENT OFFICE 2,129,941

BUMPER MAT

John H. King and Royal R. Wotring, Indianapolis, Ind.

Application December 9, 1935, Serial No. 53,602

3 Claims. (Cl. 5—1)

The invention relates to improvements in bumper mats primarily of that type used in connection with loading and unloading to absorb the shock or jar of dropping heavy pieces of merchandise on the ground from loading platforms, trucks, or the like, although the invention is capable of a large number of other uses such, for instance, as impact bumpers to be used on tug boats and the like to absorb the shock of impact when the vessel or tug "bumps" up against another vessel or pier.

One of the objects of the invention is to provide a bumper mat which will withstand severe treatment, which will not be apt to be cut by the impact of dropping a load thereon, such, for instance, as the sharp edges of barrels or sharp edges of steel drums, or the like. Another object of the invention is to provide a bumper mat which will not absorb moisture and therefore will not become heavy in wet or damp weather. Another object of the invention is to provide a bumper mat which will be comparatively light at all times, which will cause no rebound of an article when dropped thereon, and which at the same time will absorb the shock of a blow or impact. A further object of the invention is to provide a bumper mat which may be readily and easily cleaned and kept clean.

For the purpose of disclosing the invention, one embodiment thereof is illustrated in the accompanying drawing, in which Fig. 1 is a perspective view of a bumper mat embodying our invention;

Figure 1:
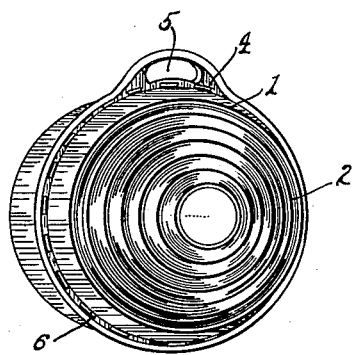
Figure 2:
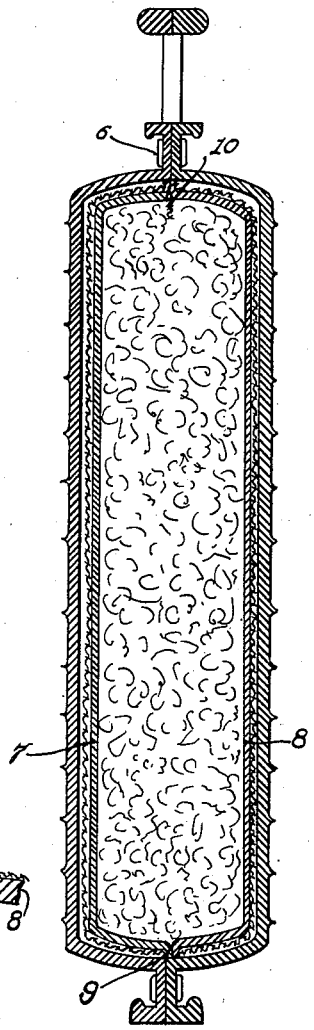
Fig. 2 is a longitudinal sectional view of the mat.
Figure 3:
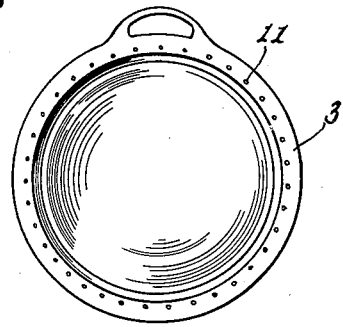
Fig. 3 is a plan view of one of the outer casing members.
Figure 4:
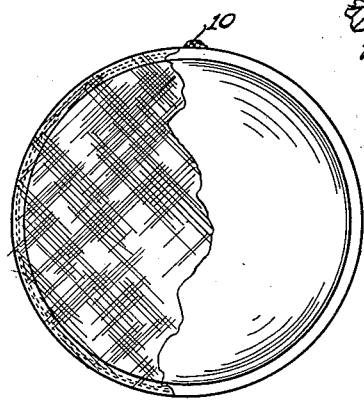
Fig. 4 is a plan view, with parts broken away, of the inner filler bag.
Figure 5:
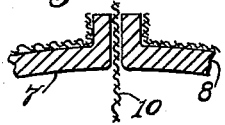
Fig. 5 is a detail section showing the breather strip in the filler bag.

In the embodiment of the invention, a pair of hollow, preferably round pan-shaped, outer sections 1 is provided. Each of these sections is identical so that a description of one will be sufficient for the description of each. The section is provided on its outer face with a series of circular ribs 2 and at its outer edge, at a point to meet the other section, with an annular flange 3. This flange at one point is widened as at 4 with a handle opening 5 formed therein. The two sections when joined together form a hollow outer casing and this casing is formed by lacing the two sections by a suitable rawhide or other lacing strip 6 passing through openings 11 in the flange 3 of each of the sections. This outer casing is formed of toughly cured pure rubber without any reinforcing material or reinforcing fabric embedded therein. It will be understood that where the term "pure" is used as applied to rubber in this connection, that term means a structure in which the entire body is formed of rubber without any reinforcing filler of fabric, wires, or other material.

For filling the hollow receptacle, we provide a filler container bag. This bag is of a round pancake formation and is formed of two sections 7 and 8 which are seamed at their outer peripheries as at 9 through the medium of an annular flange formed on each section and stitches passing through the flange. This bag, like the outer casing, is formed of "pure" rubber and when the two sections are originally formed they are not entirely cured until after the bag has been filled and the sections stitched together. As a result a practically water-tight joint is made at the point 9. At one point in the periphery where the seam is made we provide a breather opening by inserting between the two sections a small strip of fabric such as 10 which passes through the seam and at this point prevents complete vulcanization or joining of the two sections of the bag, so that trapped air in the bag may escape.

The outer surface of the bag or filler container is covered with a thin fabric, such, for instance, as cambric or the like. This covering prevents the filler members from sticking to the container, particularly during the insertion of the filler member in the container but does not prevent the stretching of the filler member after the assembly of the parts as, under the impact of blows of dropping heavy articles on the mat, this fabric readily breaks apart or splits and while providing a rubbing surface does not prevent the stretching or giving of the bag.

The bag proper is filled with a suitable filler and we have found that the most advantageous filler consists of a mixture of rubber scraps or small particles of rubber mixed with granulated cork and sawdust. While, in the commercial structure which has been produced, we find sawdust, cork and the rubber filler to be particularly advantageous, we found that very advantageous results are obtained by a filler consisting merely of ground cork and ground pieces of rubber. It has been found from experience that a filler consisting wholly of ground rubber particles is too resilient and permits a rebound of the article and also that it is too heavy for easy handling. It has also been found that in commercial practice a filler consisting merely of cork is a little too "dead" and also has a tendency to grind up into extremely small particles and become dust like.

In actual practice, the filler bag is made considerably larger in diameter than the outer casing and requires considerable force to "squeeze" the same into the casing. However, after the filler bag of larger diameter has been squeezed into the casing, and after being used a few times, this bag fully fills out the casing and completely and tightly fills the casing or receptacle.

We claim as our invention:

1. A bumper mat comprising a pair of round pan shaped sections corrugated on their outer surfaces and each section having a flange formed at its meeting edge, means for connecting said sections together through said flanges, a filler bag formed of pure rubber having a fragile fabric covering, and a filler for said bag comprising a mixture of comminuted cork and rubber.

2. A bumper mat comprising a pair of hollow pan shaped sections formed of pure rubber, each having a peripheral flange adapted to coincide with the flange of the opposite section, means extending through said flanges for connecting the sections together at their adjoining edges, a filler bag of pure rubber having a fragile fabric covering and a comminuted filler for said bag, said filler bag being sealed except for a breather opening therein.

3. A bumper mat comprising a pair of round pan-shaped sections, each section having on its outer surface a series of substantially circular raised ribs and a peripheral flange widened at one point and having an elongated opening to provide a handle, each section being formed of tough cured pure rubber having the peripheral flanges connected to form a substantially flat mat and a filler for said mat comprising a comminuted material having a low degree of resiliency to thereby provide a bumper mat capable of receiving comparatively heavy shocks with a minimum of rebound.

JOHN H. KING.
ROYAL R. WOTRING.